United States Patent [19]
Casey

[11] Patent Number: 5,628,275
[45] Date of Patent: May 13, 1997

[54] MARINE WILDLIFE RESCUE DEVICES AND METHODS FOR RESCUING MARINE WILDLIFE

[76] Inventor: Michael W. Casey, 1111 Barrow St., Unit B, Anchorage, Ak. 99501

[21] Appl. No.: 483,508

[22] Filed: Jun. 7, 1995

[51] Int. Cl.⁶ .................................................. A01K 29/00
[52] U.S. Cl. ........................................ 119/28.5; 446/153
[58] Field of Search ........................... 119/28.5, 69.5; 482/35; 446/153; 5/945, 655; 441/80, 86, 87, 43; 114/40, 35, 43, 44, 45

[56] References Cited

U.S. PATENT DOCUMENTS

| | | |
|---|---|---|
| 24,747 | 7/1859 | Mack . |
| 769,874 | 9/1904 | Paar . |
| 1,143,830 | 6/1915 | Jorgensen . |
| 1,263,824 | 4/1918 | Warminski . |
| 1,410,438 | 3/1922 | Willows et al. .................... 441/80 |
| 1,561,916 | 11/1925 | Ernst . |
| 2,854,049 | 9/1958 | Wyllie . |
| 2,859,457 | 11/1958 | Manhart . |
| 2,933,739 | 4/1960 | Miller et al. . |
| 2,971,493 | 2/1961 | Robb . |
| 3,019,457 | 2/1962 | Lowery . |
| 3,025,629 | 4/1960 | Sears . |
| 3,141,442 | 7/1964 | Harris . |
| 3,158,188 | 11/1964 | Esty . |
| 3,327,686 | 6/1967 | Holden . |
| 3,332,397 | 7/1967 | Wall . |
| 3,428,978 | 2/1969 | Johnson ............................ 441/87 |
| 3,517,649 | 6/1970 | Holden . |
| 3,619,833 | 11/1971 | Keller . |
| 3,699,921 | 10/1972 | Janicek . |
| 3,887,953 | 6/1975 | Eisenhauer . |
| 4,003,338 | 1/1977 | Neff et al. . |
| 4,063,323 | 12/1977 | Salvarezza ........................ 441/80 |
| 4,079,698 | 3/1978 | Neff et al. . |
| 4,409,921 | 10/1983 | Carroll et al. . |
| 4,487,163 | 12/1984 | Jobert et al. . |
| 4,517,920 | 5/1985 | Yamamoto . |
| 4,534,315 | 8/1985 | Sweeney . |
| 4,549,871 | 10/1985 | Verney ............................. 446/153 X |
| 4,610,219 | 9/1986 | Morimura . |
| 4,771,731 | 9/1988 | Derx et al. . |
| 4,802,442 | 2/1989 | Wilson . |
| 4,828,520 | 5/1989 | Baughman et al. . |
| 4,982,697 | 1/1991 | Neff . |
| 5,007,376 | 4/1991 | Loverich et al. . |
| 5,009,189 | 4/1991 | Neff . |
| 5,193,481 | 3/1993 | Loverich et al. . |
| 5,215,595 | 6/1993 | Popino . |
| 5,476,404 | 12/1995 | Price ............................... 446/153 X |

FOREIGN PATENT DOCUMENTS 21636  12/1908  United Kingdom ................ 441/80

*Primary Examiner*—Thomas Price
*Attorney, Agent, or Firm*—Knobbe, Martens, Olson & Bear, LLP

[57] ABSTRACT

A rescue device for oil-soaked birds or other creatures including a sanctuary formed by surrounding walls, a lower floor, and an upper floor above the lower floor having apertures for oil to pass therethrough. The upper floor is attached to the interior of the surrounding walls to form a platform for the oil-soaked animal. The upper floor and lower floor together define a drainage space within which excess oil from the animal can drain. The surrounding walls are inflatable, and the device includes a pressurized gas cartridge having a detonator valve for instantly inflating the walls. The device is hexagonally shaped and includes D-rings attached to exterior surfaces to allow a number of the devices to be hooked together to form a floating island of individual sanctuaries. Interior baffles within the surrounding walls help maintain the hexagonal shape of the device. A number of the devices can be connected together to form a floating island of multiple sanctuaries. The floating island can be overturned and to provide a floating platform for larger animals.

14 Claims, 3 Drawing Sheets

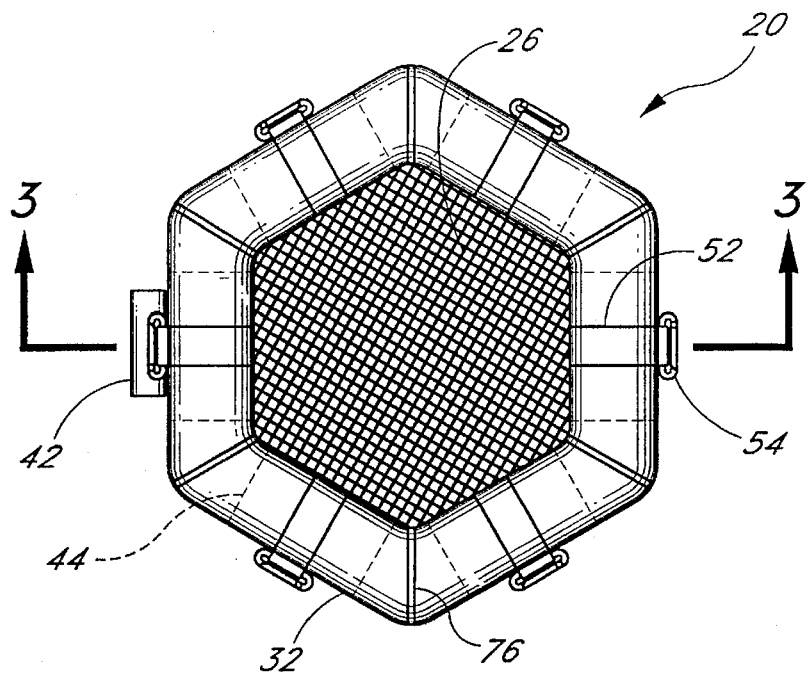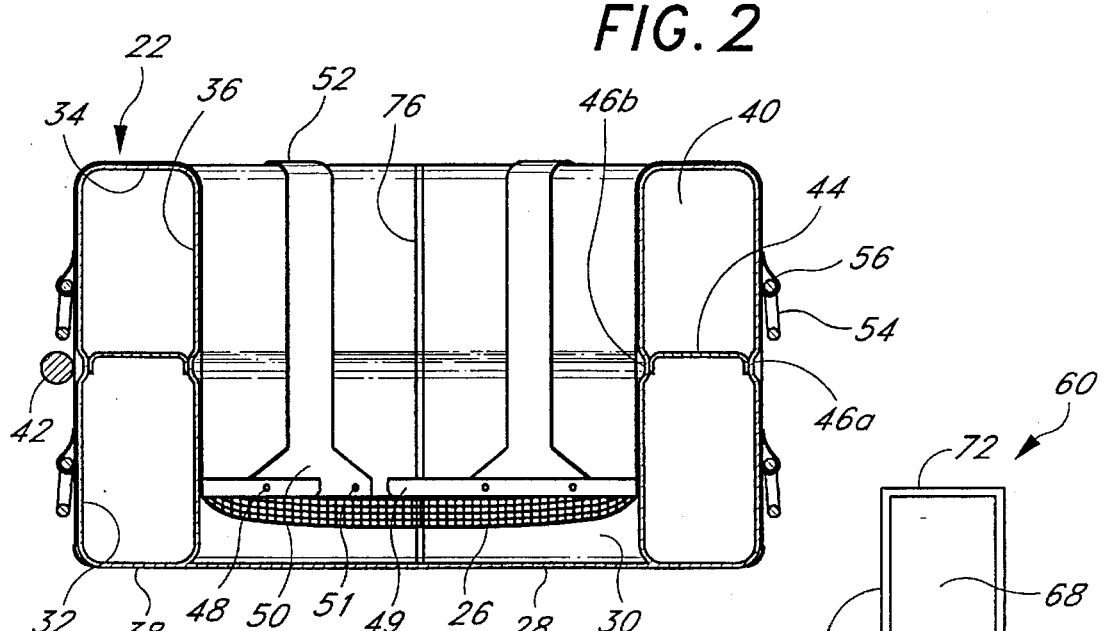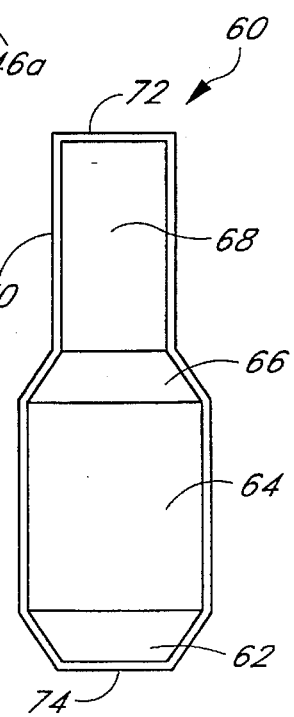

MARINE WILDLIFE RESCUE DEVICES AND METHODS FOR RESCUING MARINE WILDLIFE

FIELD OF THE INVENTION

The present invention relates to devices and methods for rescuing marine wildlife in the event of an oil spill and, more particularly, to an apparatus and method for temporarily rescuing wildlife from the deleterious effects of spilled oil by removing the wildlife from immersion in oil-saturated water.

BACKGROUND OF THE INVENTION

One of the major casualties of hydrocarbon oil spills is the resident and migrating populations of birds, mammals, and shellfish that come in contact with and swallow the oil. Marine birds, especially diving birds, appear to be the most vulnerable of the living creatures to the effects of oil spillage. Harm to birds from contact with oil is reported to be a result of breakdown of the natural insulating oils and waxes that shield the birds from water, as well as due to plumage damage and ingestion of oil.

Efforts to cleanse or rehabilitate birds or other wildlife have been generally unsuccessful because of the excessive stress that the animal experiences. If the initiation of treatment is prolonged for any reason, most, if not all, of the animals will die. Prior to attempting treatment, however, the oil-soaked animals must be removed from the immediate danger of exposure to the elements. Most marine birds, for instance, will float offshore until they die of the extreme cold, or drown. Often, as was witnessed in Prince Williams Sound during the Exxon Valdez disaster, hundreds, if not thousands, of oil-soaked animals died before rescuers had a chance to even pull them from the water. Even if animals are reached in time, many die after the trauma of the rescue and clean-up operation.

The state-of-the-art method for capturing birds and other animals either on the ground or floating offshore is to first deploy fishing nets over the animals to confine them. The fishing nets are either thrown by hand or shot from net guns over the birds. Deploying the nets can be extremely difficult in rough seas or over difficult terrains on land. So called "mist nets" are sometimes set up on land to trap oil-soaked animals that walk directly into the mist nets. Unfortunately, these mist nets are not suitable for large oily birds.

After the animals are captured, they are placed manually in boxes and transported to a cleanup center. Traditional cleanup of contaminated wildlife is very slow and laborious. It usually employs the use of soapy liquids (external) for the oil contacted externally and stomach pump devices (internal) for the swallowed oil. One can readily appreciate the dangers to the affected animals caused by the stress of the rescue operation itself. In fact, the best chance of survival for an affected animal is often to place it in a dark and warm place, which is impossible, given the sometimes overwhelming demand on the clean-up crews.

SUMMARY OF THE INVENTION

The present invention provides improved apparatuses and methods for rapidly initiating treatment of marine wildlife after an oil spill. In one embodiment the present invention comprises a floatable raft-like buoyant structure for providing safe haven for oil-soaked marine birds and other wildlife. In use, the invention can be floated to within the immediate vicinity of the harmed wildlife. Rehabilitation of the wildlife may thus be initiated as soon as the oil-soaked animals are plucked from the oil.

A significant feature of the present invention is the ability to rescue marine life stricken by an oil spill rapidly and with minimum trauma. The method includes removing the wildlife from the immediate danger of the oil spill and placing them in a buoyant sanctuary having an impermeable bottom floor and an elevated porous floor over the bottom floor. The oil and/or water from the affected wildlife can thus drain through the elevated porous floor of the sanctuary. Furthermore, the sanctuary isolates the affected wildlife from the elements and from further human contact until more comprehensive cleaning and rehabilitation can be accomplished. The method includes floating the sanctuaries in the water in the immediate vicinity of the stricken wildlife exposed to an oil spill. The exposed marine life are then placed in the sanctuaries on the elevated porous floor. The sanctuaries can then be towed to safety on land or lifted into a vessel for transport.

Another advantage of the present invention is the ability to connect a plurality of the floatable raft-like devices to provide an agglomeration or "island" of individual sanctuaries for oil-soaked marine birds and other wildlife. The coupled sanctuaries filled with traumatized birds are towed to safety without excessive human contact with the birds. Another feature of the present raft-like devices is the ability to form a larger "island" by inverting the devices and coupling them together. A larger buoyant platform can be used for rescuing large mammals, for example.

In its preferred embodiment, a buoyant sanctuary is formed by a closed-loop wall structure surrounding the sanctuary and having an open top, a lower floor attached to the bottom of the wall structure, and an upper floor disposed above the lower floor and attached to an inner surface of the wall structure. The upper floor is constructed sufficiently strong to support the oil-soaked animals and includes apertures therein to allow oil to pass therethrough. The oil-soaked animal is placed within the sanctuary and on the upper floor, thus providing both protection from the elements and allowing some of the excess oil on the animal to drip through the upper floor onto the lower floor.

In the preferred embodiment, the closed-loop wall structure is flexible and forms an inflation chamber. Further, the upper floor of the device is advantageously formed of a flexible mesh. A source of pressurized gas is attached to the deflated wall structure to allow compact storage and instant deployment. Preferably, the inflatable wall structure is shaped as a hexagon and includes a plurality of attachment rings on its exterior for joining a number of the devices together without any substantial gaps therebetween.

BRIEF DESCRIPTION OF THE DRAWINGS

FIG. 2 is a top view of the animal rescue device of FIG. 1;

FIG. 3 is a cross-sectional view of the animal rescue device taken along line 3—3 of FIG. 2; and FIG. 4 is a plan view of a single panel used in construction of the animal rescue device.

DESCRIPTION OF THE PREFERRED EMBODIMENTS

Figure 1:
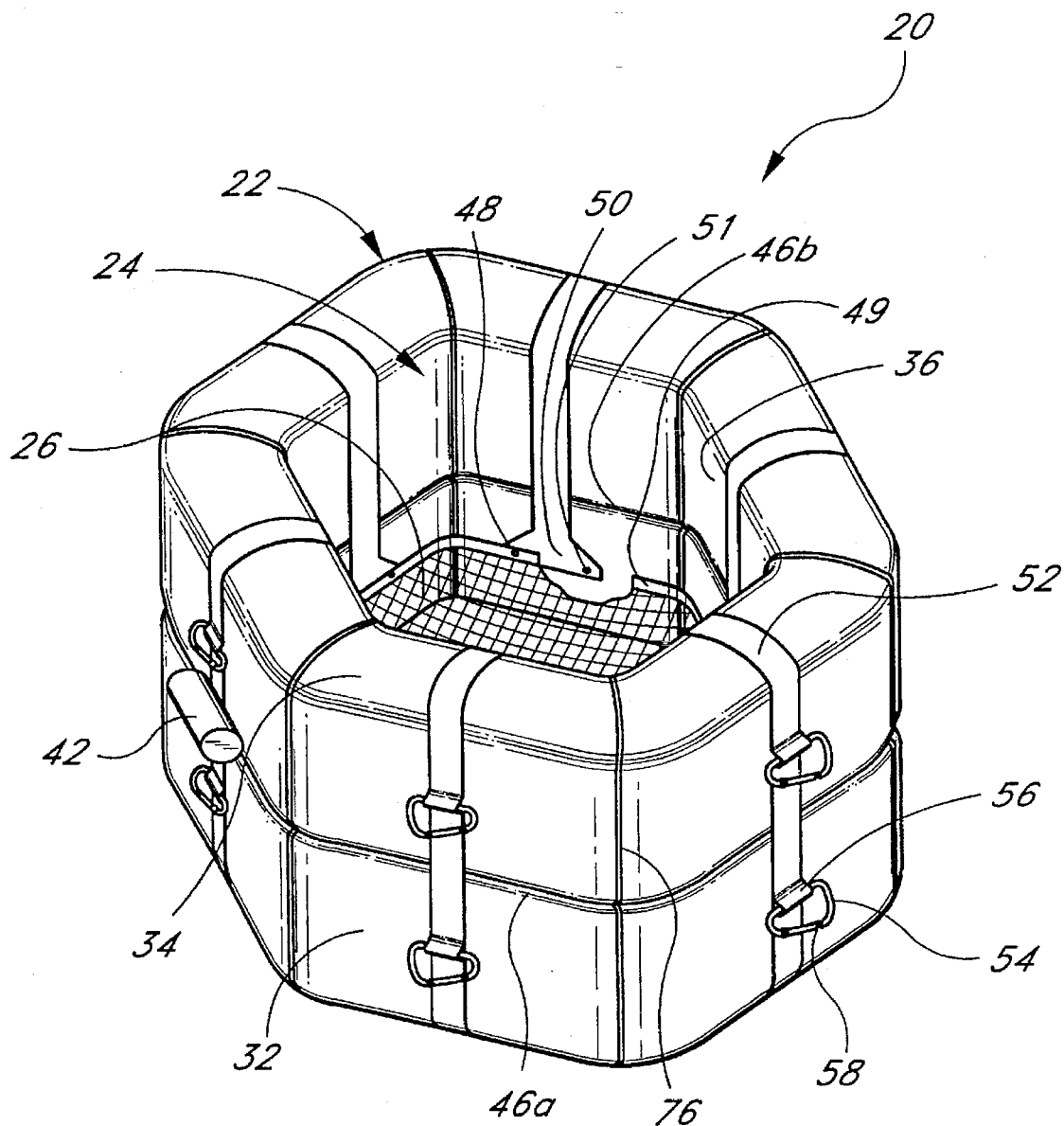
FIG. 1 is a perspective view of a preferred embodiment of an animal rescue device of the present invention.

FIG. 1 illustrates a preferred embodiment of the present animal rescue device 20. The device is formed by a peripheral wall structure 22 defining a sanctuary 24 therein. The wall structure 22 is formed in a closed loop and has an open top. An upper, substantially porous floor 26 is secured within the sanctuary 24 to provide a platform on which oil-soaked birds or other animals may be placed. As seen best in FIG. 3, the device 20 also includes a lower impermeable floor 28 underneath the upper floor 26, preventing ingress of outside sea water into the sanctuary 24.

The upper porous floor 26 preferably comprises a flexible mesh having suitably sized apertures for allowing oil to pass through. The bird or other creature is supported on the upper floor 26 while excess oil drains through the mesh into a drainage space 30 above the lower floor 28. Although the present invention is described in terms of one preferred embodiment, it may be variously configured to provide a sanctuary for an oil-soaked bird or other such creature, the sanctuary having a porous upper floor on which the bird is supported above a nonpermeable lower floor. Moreover, although the present invention is especially adapted for marine rescue operations and has significant advantages over the prior art in this respect, the device can be utilized on land as well. On either land or water, the invention provides an outer sanctuary wall for protection from the elements, as well as a porous support surface through which oil can be drained to begin the process of cleaning the bird.

With reference again to FIGS. 1 and 3, the wall structure 22 preferably comprises an outer wall 32, a top wall 34, an inner wall 36, and a bottom wall 38. The combination of the walls 32, 34, 36, and 38 defines an inflation chamber 40 therein. The lower floor 28 stretches across the bottom of the device 20 and joins to the wall structure 22 at the approximate intersection of the inner wall 36 and bottom wall 38. A pressurized gas cartridge 42 is secured to an exterior portion of the wall structure 22 and functions in concert with a safety valve to fill the inflation chamber 40. The cartridge 42 is preferably filled with pressurized $CO_2$ and is fluidly connected to the inflation chamber 40 through a Roberts-type detonator valve. In this type of valve, the contents of the gas cartridge 42 can be instantaneously expelled into the inflation chamber, and the valve holds the pressure therein until released by a separate safety valve. Typically, all that is required to inflate the device 20 is to pull a detonator lanyard (not shown) similar to those found on inflatable life vests.

As seen in FIGS. 1 and 2, the device 20 is preferably constructed in a hexagonal shape. A plurality of baffles 44 shown in dashed lines in FIG. 2 are provided to help maintain the preferred hexagonal shape when the device is inflated. As seen from FIG. 3, the baffles 44 extend across from the outer wall 32 to the inner wall 36 at an approximate midpoint of the inflation chamber 40, thus defining a baffle line 46a, 46b in each of the respective walls. The baffles 44 are thus rectangular panels, having a width approximately equal to the width of each of the six sides of the inner wall 36 and having a length slightly smaller than both the top wall 34 and bottom wall 38. Although the device 20 preferably comprises a hexagonal shaped ring, the shape of the wall structure 22 may be circular or other geometric configurations. Indeed, the wall structure 22 may be shaped as a torus, having circular inner and outer walls and an inflatable chamber therein, or other suitable closed-loop shape.

A preferred type of material for the extreme lower floor 28 is an extrusion-coated reinforced membrane or Hypolon material. Hypolons are in a class of materials with two layers fused together. One such material is given the trade name CoolThane™ Polyurethane No. L-3984 UPW, manufactured by Coolie, Inc., of Los Angeles, Calif. This product is a nylon-reinforced waterproof material. The remaining portions of the wall structure 22 are preferably constructed of a lighter reinforced waterproof fabric of similar composition. One example is a CoolThane™ Product No. L-1416 DEP, manufactured by Coolie, Inc. This material has a polyester fill. Both these materials can be sealed with either dielectric or thermal processes.

The upper porous floor 26 is advantageously made to be easily removed from the interior of the device 20 for cleaning or replacement. In the preferred embodiment of the invention, the floor 26 is attached inside the sanctuary 24 via snaps 48 on a peripheral band 49 coupled to snaps 51 provided on an attachment portion 50 of an elongated band 52. A portion of the upper floor 26 is shown cutaway in FIG. 1 to expose the attachment portion 50 and one of the snaps 51. Two such snaps 48, 51 are provided per side of the device 20, although other numbers are possible. Furthermore, the provision of snaps to attach the upper floor 26 inside the sanctuary 24 is preferred for ease of removal and may be replaced by suitable quick-release fastening means. Indeed, it is preferable to be able to remove the upper floor 26 for cleaning, but nevertheless, the upper floor may be permanently attached within the sanctuary 24.

The vertically arranged bands 52 serve two important functions. First, they distribute the loads supported by the upper porous floor 26 over a substantial portion of the wall structure 22. Second, the bands 52 provide an attachment for D-rings 54 illustrated in FIGS. 1–3. Six bands 52 are preferably provided, one for each of the six sides of the wall structure 22. The bands 52 extend from the attachment portion 50 proximate the upper floor 26, up the inner wall 36, across the top wall 34, and down the side of the outer wall 32. The bands 52 are preferably bonded along their entire lengths to the wall structure 22, except at two locations where the D-rings 54 are captured within loops 56 formed by the bands. The D-rings 54 include spring-loaded closures 58. As a result, both the upper floor 26 is thus securely supported within the sanctuary 24 by the bands 52, and the D-rings 54 are securely supported outside the sanctuary by the bands 52.

The upper floor 26 of the device 20 is preferably a nylon mesh fabric with either 400 or 500 perforations per square foot, depending on the source available. The preferred mesh fabric of the upper floor 26 provides an additional feature, namely, a mild abrasive action to aid in the removal of heavy petroleum chemicals by the natural movement of the bird or other creature. A similarly constructed nylon-reinforced web netting not shown) may also be provided to cover the top of the sanctuary 24 for transportation purposes while a creature ms positioned in the animal rescue device 20.

Figure 5:
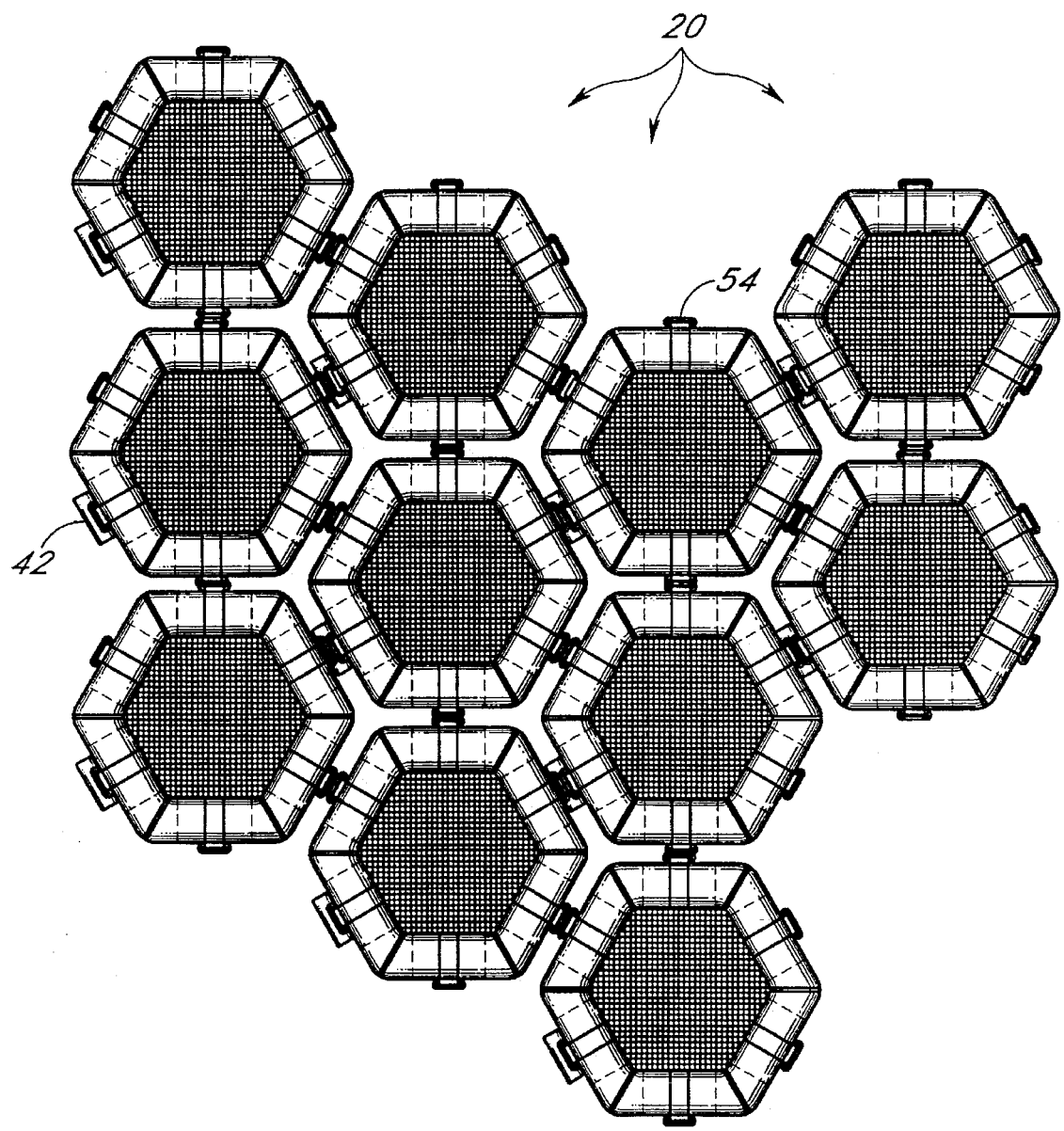
FIG. 5 is a top plan view of a floating island consisting of a plurality of animal rescue devices linked together.

A significant feature of the preferred embodiment of the invention is that the animal rescue devices 20 may be conveniently joined together along their exterior sides to group a plurality of oil-soaked birds or other creatures in a "floating island." Such an agglomeration of devices 20 is seen in FIG. 5. This allows for the rapid removal of a multitude of oil-soaked birds from the water with a minimum of trauma. The D-rings 54 are provided on the exterior of the device for linking a number of devices together. These D-rings 54 include the aforementioned spring-loaded closures 58, which can be easily disengaged to secure one D-ring to another. The D-rings can also be used to attach a tow line for pulling a "floating island" of attached devices 20 short distances.

The hexagonal ring shape is preferred so that a plurality of the devices 20 can be coupled together along their flat outer walls 32 to efficiently utilize the space available and minimize gaps between the linked devices. The flat sides are juxtaposed and opposed D-rings 54 attached together. The inflation cylinder 42 is relatively small and can be compressed between the adjacent pliant walls 32. As mentioned, the internal baffles 44 perform the important function of maintaining the geometric shape of the animal rescue device 20. Without the baffles 44, the device 20 would tend to round out into a torus. Although a torus could be utilized, the preferred hexagonal shape allows a plurality of the devices to be closely packed with only small gaps inbetween. Thus, a relatively continuous planar floating support surface can be formed by inverting a number of the devices coupled together.

The animal rescue device 20 can be manufactured in various sizes to accommodate animals from the smallest of birds up to larger marine mammals. In some cases, it may be impractical to provide a device 20 for the largest mammals. In these situations, a number of the devices 20 can be overturned and attached together to provide a floating platform. Around the perimeter of this floating platform, a circle of devices 20 oriented right side up are preferably attached and filled with sea water. The surrounding perimeter of water-filled devices 20 thus produces a stabilizing effect for the floating platform.

The animal rescue device 20 is advantageously constructed from a number of panels 60, such as shown in FIG. 4. Each of the panels is formed by a bottom wall section 62, an outer wall section 64, a top wall section 66, and an inner wall section 68. Furthermore, an outer border 70 provides overlap material for the subsequently formed seams between the panels. The outer wall section 64 and inner wall section 68 are rectangular in shape, with a long dimension in the direction of the connected sections. The outer wall section 64 is sized slightly larger than the inner wall section in a lateral direction. The top wall section 66 is trapezoidal in shape and provides a transition between the width of the outer wall section 64 and that of the inner wall section 68. Likewise, the bottom wall section 62 is trapezoidal and provides a transition between the outer wall section 64 and the inner wall section 68 when a free end 72 of the inner wall section is attached to a free end 74 of the bottom wall section.

There are thus six panels 60 used in constructing the wall structure 62, with the six outer wall sections 64 defining the complete six-sided outer wall 32. Likewise, the six inner wall sections 68 combine to form the six-sided inner wall 36. The panels 60 are joined together at six seams 76 extending around the entire wall structure 22 at the corners of the hexagon. It has been discovered that the hexagonal shape of the animal rescue device 20 reduces the amount of material required for a given size. That is, the use of six panels 60 to form the device 20 is an extremely efficient design, thus reducing fabrication costs.

Assembly Steps

The panels 60 are cut to the specific shapes, and the baffles 44 are likewise cut to the preferred rectangular shape. The long sides of each of the outer wall sections 64 are welded together in succession until the six outer wall sections define a closed shape. The borders 72 protrude outward from this closed shape. Next, each of the borders of the top wall sections 66 of the adjacent panels 60 are welded together. Next, the borders of the inner wall section 68 are welded. And finally, the borders of the adjacent bottom wall section 62 are welded together.

Prior to attaching any of the panels 60 together, or at this stage in the assembly process, each of the baffles 44 may be welded to a midpoint in each of the outer wall sections 64. After welding all of the adjacent borders of the six panels 60 together, and before the ends 72 and 74 are joined, the structure is inverted so that the seams formed by the borders 70 face inward.

At this point, the free ends of the internal baffles 44 are welded to the midpoint of each of the inner wall sections 68. Next, the bottom seams between the free ends 72 and 74 are welded to generally form a torus shape. The hexagonally shaped lower floor 28 may also be joined to the seam between the free ends 72 and 74 of each of the panels 60.

The bands 52 are then respectively welded to the exterior of each of the panels 60. As discussed above, each band 52 is welded along its entire length except for at the two regions where the loops 52 are formed. After construction of the device 20, the D-rings 54 may be inserted through the loops 56.

In an exemplary configuration of the present device 20, the height is 20 inches, while the distance from an exterior side of the hexagon to the opposite exterior side is approximately 36 inches. The width of the wall structure 22 is approximately 6 inches. The upper floor 26 is positioned at least 3 inches, and preferably 6 inches, above the lower floor 28. The inner sanctuary 24 from one hexagonal side to the other is preferably at least 24 inches wide and 14 inches deep. Desirably, the depth of the sanctuary 24 is such that it is difficult for the distressed animal to escape and possibly injure itself. The depth may be varied depending on the type of animal being rescued and its potential for escape.

While the above description presents the preferred embodiment, the present invention may be embodied in other specific forms without departing from its spirit or essential characteristics.

I claim:

1. A flotation device for rescuing oil-soaked birds, comprising:
    a generally hexagonal, inflatable outer wall structure defining a cavity therein of at least one foot in width and of a size that can be handled by a single person;
    a fluid-impermeable lower floor covering the bottom of the cavity and sealingly attached around the lower periphery of the outer inflatable wall structure;
    an upper floor constructed of fluid-permeable material stretched across the cavity and attached to the inner sides of the inflatable outer wall structure a specified distance above the lower floor;
    a band secured to the inner surface of the inflatable outer wall structure on each of the six hexagonal sides, the band extending over an upper rim of the inflatable wall structure and down an outer surface of the inflatable wall structure;
    at least one attachment member secured to the flotation device by said bands on each of said six sides of the hexagonal inflatable wall structure; and
    a pressurized gas cartridge secured to one of said bands and adapted to inflate said device.

2. A flotation device for rescuing oil-soaked birds, comprising:
    a generally hexagonal, inflatable outer wall structure defining a cavity therein of at least one foot in width;
    a fluid-impermeable lower floor covering the bottom of the cavity and sealingly attached around the lower periphery of the outer inflatable wall structure;
    an upper floor constructed of fluid-permeable material stretched across the cavity and attached to the inner sides of the inflatable outer wall structure a specified distance above the lower floor;

a band secured to the inner surface of the inflatable outer wall structure on each of the six hexagonal sides, the band extending over an upper rim of the inflatable wall structure and down an outer surface of the inflatable wall structure; and at least one attachment member secured to the flotation device by said bands on each of said six sides of the hexagonal inflatable wall structure.

3. The flotation device of claim 2, wherein said upper floor is detachably mounted to a first end of said bands at the inner surface of said inflatable wall structure.

4. The flotation device of claim 3, wherein said bands include flared portions on the inner surface of said inflatable wall structure, said flared portions having two or more snaps for demountably attaching to mating snaps on the periphery of said upper floor.

5. The flotation device of claim 2, wherein said inflatable wall structure comprises a plurality of individual panels sealingly attached together at seams located at the corners of the hexagonal wall structure.

6. The flotation device of claim 5, wherein each of said panels comprises a bottom wall section, an outer wall section, a top wall section, and an inner wall section, said outer wall section and said inner wall section lying parallel in the assembled flotation device, and further comprising a baffle connecting said outer wall section to said inner wall section across the interior of said inflatable wall structure on each of said six sides.

7. The flotation device of claim 2, wherein said attachment members comprise spring-loaded D-rings.

8. A flotation device for rescuing oil-soaked birds, comprising:

an inflatable member enclosing a buoyant sanctuary;

a fluid-impermeable lower floor covering the bottom of the sanctuary and sealingly attached around the lower periphery of the inflatable member;

an upper floor constructed of fluid-permeable material stretched above the lower floor; and a series of supports secured to the inflatable member holding said upper floor structure within the sanctuary.

9. The flotation device of claim 8, wherein said inflatable member is constructed of an extrusion-coated reinforced membrane material, said lower floor is constructed of said extrusion-coated reinforced membrane material, and said upper floor comprises a flexible mesh having suitably sized apertures for allowing oil to pass therethrough.

10. A method of constructing a flotation device, comprising the steps of:

forming a plurality of individual panels, each individual panel having a bottom wall section, opposed outer wall sections, a top wall section, and an inner wall section, said inner wall section having a free end;

sealingly bonding an outer wall section of one panel to an outer wall section of a second panel along an edge between said bottom wall section and said top wall section of each;

sealingly bonding a plurality of panels together at their outer wall sections and joining the first panel to the last panel at their outer wall sections to form a closed loop;

sealingly bonding adjacent edges of each top wall section of the panels;

bonding the adjacent edges of each inner wall section together;

bonding the adjacent edges of each bottom wall section together;

turning the bonded closed loop structure formed by the panels inside out so that the bonded seams face inward;

bonding the bottom wall section of each panel to the free end of the inner wall section of each panel to generally form an air-tight torus;

sealingly attaching a fluid-impermeable lower floor to each of the bottom wall sections to define a cavity within said torus; and attaching a fluid-permeable upper floor to said inner wall sections above said lower floor and within said cavity.

11. The method of claim 10, additionally comprising the steps of:

forming said plurality of individual panels so that each individual panel includes a trapezoidal bottom wall section attached at its longer parallel side to a rectangular outer wall section, said outer wall section having a first width and being attached at an edge opposite said bottom wall section to a long parallel side of a trapezoidal top wall section, the short parallel side of said top wall section being attached to an edge of a rectangular inner wall section, said inner wall section having a second width smaller than said first width and having a free end;

sealingly bonding adjacent angled edges of each trapezoidal top wall section of the panels;

bonding the adjacent angled edges of each bottom wall section together;

bonding the short side of each trapezoidal bottom wall section of each panel to the free end of the inner wall section of each panel to generally form an airtight torus.

12. A method for rescuing marine wildlife following an oil spill and removing such wildlife from immediate danger as rapidly as possible, comprising the steps of:

floating in the water, in the immediate vicinity of marine wildlife exposed to an oil spill, a buoyant sanctuary having a bottom floor and an elevated porous floor over said bottom floor;

placing said exposed marine life on top of said elevated porous floor; and allowing the oil and/or water on said exposed marine life to drain therefrom through said porous floor onto said bottom floor.

13. The method of claim 12, additionally comprising the step of:

floating in the water, in the immediate vicinity of marine wildlife exposed to an oil spill, a second buoyant sanctuary and coupling said sanctuaries together to form a floating island of multiple sanctuaries.

14. The method of claim 13, additionally comprising the step of:

inverting said floating island of multiple sanctuaries to expose multiple bottom floors which together define a floating platform suitable for supporting larger marine animals out of the water.

* * * * *